(12) United States Patent
Yang et al.

(10) Patent No.: US 12,182,449 B2
(45) Date of Patent: Dec. 31, 2024

(54) SYSTEMS AND METHODS FOR MANAGING A STORAGE SYSTEM

(71) Applicant: Samsung Electronics Co., Ltd., Suwon-si (KR)

(72) Inventors: Qirui Yang, San Diego, CA (US); Bridget Davis, San Diego, CA (US); Devasena Inupakutika, Rockville, MD (US); Adam Manzanares, San Jose, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

(21) Appl. No.: 18/200,249

(22) Filed: May 22, 2023

(65) Prior Publication Data
US 2023/0409240 A1 Dec. 21, 2023

Related U.S. Application Data

(60) Provisional application No. 63/447,520, filed on Feb. 22, 2023, provisional application No. 63/345,900, filed on May 25, 2022.

(51) Int. Cl.
*G06F 3/06* (2006.01)
(52) U.S. Cl.
CPC .......... *G06F 3/0659* (2013.01); *G06F 3/0611* (2013.01); *G06F 3/0685* (2013.01)
(58) Field of Classification Search
CPC .... G06F 3/0659; G06F 3/0611; G06F 3/0685; G06F 3/0649
See application file for complete search history.

(56) References Cited

U.S. PATENT DOCUMENTS 6,240,492 B1 * 5/2001 Foster ................. G06F 13/4243
  711/149
6,247,042 B1 6/2001 Engstrom et al.
(Continued)

FOREIGN PATENT DOCUMENTS

| CN | 112667528 A | 4/2021 |
| JP | 8-161230 A | 6/1996 |
| JP | 3555523 B2 | 5/2004 |

OTHER PUBLICATIONS

Doudali, Thaleia Dimitra, et al., "Kleio: A Hybrid Memory Page Scheduler with Machine Intelligence," Proceedings of the 28th International Symposium on High-Performance Parallel and Distributed Computing, Jun. 22-29, 2019, pp. 37-48.
(Continued)

*Primary Examiner* — Sean D Rossiter
(74) *Attorney, Agent, or Firm* — Lewis Roca Rothgerber Christie LLP

(57) ABSTRACT

One or more embodiments of the present disclosure describe a storage system comprising a first storage medium, a second storage medium, and a controller configured to communicate with the first storage medium and the second storage medium. The controller is configured to receive a first request generated by a process associated with first data; determine that the first data is stored in the first storage medium; generate a signal based on the controller being configured to determine; identify a criterion based on the signal; select, based on the criterion, at least one of a first procedure or a second procedure for loading second data from the second storage medium to the first storage medium; and output the second data based on a second request generated by the process for the second data.

20 Claims, 7 Drawing Sheets

(56) References Cited

U.S. PATENT DOCUMENTS

| | | | |
|---|---|---|---|
| 6,317,818 B1 | 11/2001 | Zwiegincew et al. | |
| 7,047,362 B2 * | 5/2006 | Kim | G06F 12/0897 |
| | | | 711/E12.017 |
| 8,850,123 B2 | 9/2014 | Dubrovin et al. | |
| 9,286,221 B1 * | 3/2016 | Sundararajan | G11C 7/1072 |
| 9,582,204 B2 | 2/2017 | Sarcone et al. | |
| 10,397,365 B2 | 8/2019 | Abali et al. | |
| 10,445,076 B1 * | 10/2019 | Legler | G06F 16/24552 |
| 10,877,683 B2 | 12/2020 | Wu et al. | |
| 10,896,136 B2 | 1/2021 | Bae et al. | |
| 10,963,394 B2 | 3/2021 | Kachare et al. | |
| 2008/0183903 A1 * | 7/2008 | VanStee | G06F 13/161 |
| | | | 710/5 |
| 2017/0220471 A1 | 8/2017 | Meredith | |
| 2020/0034294 A1 | 1/2020 | Calciu et al. | |
| 2020/0409597 A1 * | 12/2020 | Ganesh | G06F 3/0659 |
| 2021/0240584 A1 | 8/2021 | Pu | |
| 2021/0279222 A1 * | 9/2021 | Peng | H04N 21/643 |
| 2021/0373951 A1 | 12/2021 | Malladi et al. | |
| 2021/0390053 A1 | 12/2021 | Roberts | |
| 2022/0254419 A1 | 8/2022 | Kim et al. | |
| 2022/0343164 A1 * | 10/2022 | Espeholt | G06N 3/045 |

OTHER PUBLICATIONS

EPO Extended European Search Report dated Jun. 19, 2024, issued in European Patent Application No. 24159036.3 (11 pages).

* cited by examiner

SYSTEMS AND METHODS FOR MANAGING A STORAGE SYSTEM

CROSS-REFERENCE TO RELATED APPLICATION(S)

The present application claims priority to and the benefit of U.S. Provisional Application No. 63/447,520, filed Feb. 22, 2023, entitled "RACK-SCALE HYBRID MEMORY POOL MANAGEMENT SYSTEM AND METHOD" and claims priority to and the benefit of U.S. Provisional Application No. 63/345,900, filed May 25, 2022, entitled "PERFORMANCE EVALUATION ON CXL-ENABLED HYBRID MEMORY POOL", the entire content of each of which is incorporated herein by reference.

FIELD

One or more aspects of embodiments according to the present disclosure relate to storage systems, and particularly to managing retrieval of data from the storage system.

BACKGROUND

An application may interact with a storage system for reading and writing data. Latencies are generally involved in accessing the storage system. The type of latency involved may depend on the type of storage device included in the storage system. Certain storage devices have lower access latencies than other storage devices. Thus, it may be desirable to manage retrieval of data from the storage devices with low access latency.

The above information disclosed in this Background section is only for enhancement of understanding of the background of the present disclosure, and therefore, it may contain information that does not form prior art.

SUMMARY

One or more embodiments of the present disclosure describe a storage system comprising a first storage medium, a second storage medium, and a controller configured to communicate with the first storage medium and the second storage medium. The controller is configured to receive a first request generated by a process associated with first data; determine that the first data is stored in the first storage medium; generate a signal based on the controller being configured to determine; identify a criterion based on the signal; select, based on the criterion, at least one of a first procedure or a second procedure for loading second data from the second storage medium to the first storage medium; and output the second data based on a second request generated by the process for the second data.

According to some embodiments, a latency associated with accessing the first storage medium is lower than a latency associated with accessing the second storage medium.

According to some embodiments, the signal is generated based on determining absence of the first data in the first storage medium.

According to some embodiments, the controller is configured to load the first data from the second storage medium to the first storage medium.

According to some embodiments, the criterion includes a success metric associated with the second data.

According to some embodiments, the success metric is based on success of loading the second data from the second storage medium to the first storage medium.

According to some embodiments, the controller is further configured to: add a second memory location associated with the second data to a log; and update the log to indicate success of fulfilling the second request from the first storage medium.

According to some embodiments, the criterion includes an availability of a computing resource.

According to some embodiments, the first procedure is configured to identify a second memory location storing the second data based on an identified access pattern.

According to some embodiments, the second procedure includes a neural network configured to predict a second memory location storing the second data based on input features to the neural network.

One or more embodiments of the present disclosure also describe a method comprising: receiving a first request generated by a process associated with first data; determining that the first data is stored in a first storage medium; generating a signal based on the determining; identifying a criterion based on the signal; selecting, based on the criterion, at least one of a first procedure or a second procedure for loading second data from a second storage medium to the first storage medium; and outputting the second data based on a second request generated by the process for the second data.

These and other features, aspects and advantages of the embodiments of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

DETAILED DESCRIPTION

Figure 1:
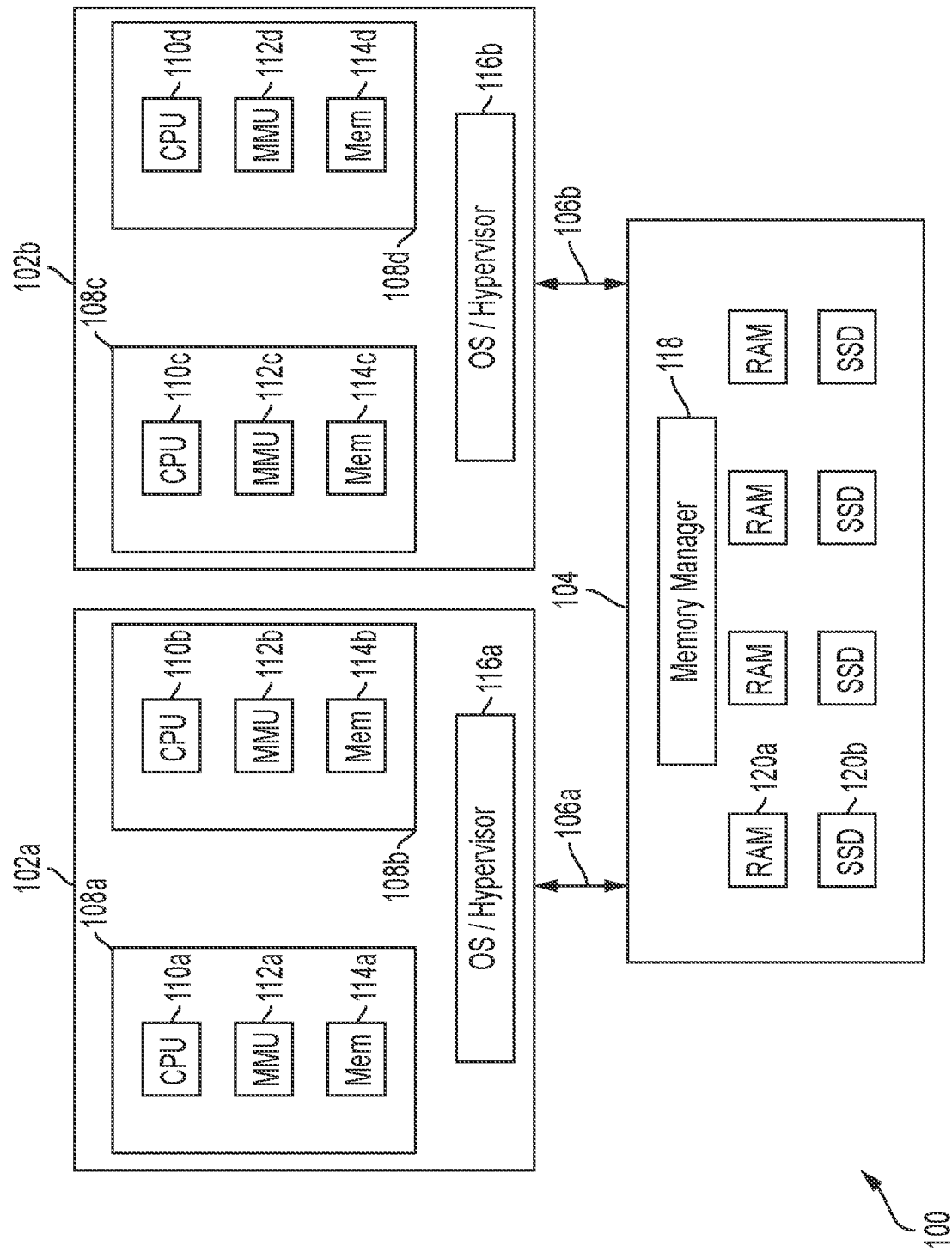
FIG. 1 depicts a block diagram of a computing environment for managing a storage system according to one or more embodiments.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

Embodiments of the present disclosure are described below with reference to block diagrams and flow diagrams. Thus, it should be understood that each block of the block diagrams and flow diagrams may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flow diagrams. Accordingly, the block diagrams and flow diagrams support various combinations of embodiments for performing the specified instructions, operations, or steps.

In general terms one or more applications running on one or more application servers may need to access a storage system to read and write data. Latencies are generally involved in accessing data from the system. The latencies involved may differ depending on the type of storage device that is accessed. For example, a main memory device such as a dynamic random access memory (DRAM) may have lower latencies than a secondary memory device such as a solid state drive (SSD). Although main memory devices allow fast access, they may have smaller capacity and generally be more expensive and consume more energy than secondary memory devices.

It may be desirable to have a storage system that includes different types of storage devices to balance the advantages and disadvantages associated with a particular type of storage device. For example, it may be desirable to have one or more lower-latency memory devices to store copies of at least some of the data (e.g., frequently accessed data) to allow fast access to such data, and one or more high-latency memory devices to store other data (e.g., less frequently accessed data). Pooling the different types of memory devices together into the storage system may also help lower costs while helping to maintain a desired data access performance.

In general terms, embodiments of the present disclosure are directed to systems and methods for managing a storage system including different types of storage devices with different access latencies. The storage system may include at least one lower-latency memory device (also referred to as a primary storage) and at least one higher-latency memory device (also referred to as secondary storage).

A memory controller may manage requests to and from the memory devices. For example, the memory controller may receive a memory access request from a process and determine whether the requested memory address is found in the primary storage. The controller may generate a memory fault or memory failure (collectively referred to as "memory fault" or "page fault") signal in response to detecting that a page associated with the memory address is not stored in the primary storage. The memory fault may be recorded for the process in association with the requested address. The controller may further load the page associated with the requested memory address from the secondary storage to the primary storage.

In some embodiments, the controller is configured to load one or more pages other than the page associated with the memory fault, in anticipation that the one or more pages will also be requested by the process. The prefetching may cause the loading of the one or more other pages from the secondary storage to the primary storage, before the process requests and/or uses the data. The prefetching of the data may help reduce the data access time incurred by the process.

In some embodiments, the prefetching is performed according to a selected prefetching algorithm. The prefetching algorithm that is selected may be one of a machine-learning (ML) based prefetching algorithm or a non-ML based prefetching algorithm. In some embodiments, the ML based algorithm is more accurate in predicting the pages to prefetch than the non-ML based algorithm.

In some embodiments, the type of prefetching algorithm that is selected depends on one or more criteria. The one or more criteria may include a success (e.g., hit) rate of data prefetched using a current prefetching algorithm, availability of computing resources, and/or the like. For example, if the current prefetching algorithm is a non-ML based algorithm, a switch may be made to a higher accuracy ML-based algorithm in response to the success rate being lower than a threshold. If, however, the non-ML based algorithm achieves a success rate that is higher than the threshold, the non-ML based algorithm may continue to be used as it may not be necessary to achieve a higher prefetching accuracy by invoking the ML based algorithm.

In another example, the ML based algorithm may use a larger amount of computing resources than a non-ML based algorithm. Thus, the non-ML based algorithm may be selected in response to the availability of computing resources being below a threshold, or the use of computing resources being above a threshold.

FIG. 1 depicts a block diagram of a computing environment 100 for managing a storage system according to one or more embodiments. The computing environment may include one or more computing devices 102a-102b (collectively referenced as 102) coupled to a storage system 104. In some embodiments, the computing devices 102 are housed in a rack (not shown) along with the storage system 104.

The computing devices 102 and the storage system 104 may communicate with each over an interface 106a, 106b (collectively referenced as 106). In some embodiments, the interface 106 (e.g., the connector and the protocol thereof) includes various general-purpose interfaces such as, for example, Ethernet, Universal Serial Bus (USB), and/or the like. In some embodiments, the interface 106 (e.g., the connector and the protocol thereof) may include (or may conform to) a Compute Express Link (CXL), Cache Coherent Interconnect for Accelerators (CCIX), dual in-line memory module (DIMM) interface, Small Computer System Interface (SCSI), Non Volatile Memory Express (NVMe), Peripheral Component Interconnect Express (PCIe), remote direct memory access (RDMA) over Ethernet, Serial Advanced Technology Attachment (SATA), Fiber Channel, Serial Attached SCSI (SAS), NVMe over Fabric (NVMe-oF), iWARP protocol, InfiniBand protocol, 5G wireless protocol, Wi-Fi protocol, Bluetooth protocol, and/or the like.

In some embodiments, the computing device 102 hosts one or more virtual machines (VMs) 108a-108d (collectively referenced as 108). The one or more VMs 108 may share a processor 110a-110d (collectively referenced as 110), memory management unit (MMU) 112a-112d (collectively referenced as 112), and memory 114a-114d (collectively referenced as 114). The processor 110 may be configured to run one or more VMs 108 which run one or more processes or applications such as, for example, a big data analysis application, e-commerce application, database application, machine learning application, and/or the like. The MMU 112 may be configured to translate a logical memory address contained in a data access request from a process, into a physical memory address. The translation may be via a page table and/or translation lookaside buffer (TLB) (not shown) located, for example, in the MMU 112. The memory 114 may be an instance of a main memory such as a random access memory (RAM), and/or the like.

In some embodiments, an operating system or a hypervisor software 116a, 116b may manage allocation of the physical resources of the computing server 102 to allow the computing server to support multiple VMs (e.g., VM 108a and VM 108b). In some embodiments, the hypervisor software 116 implements a device passthrough to allow the VM 108 to access the storage server 104 (e.g., directly), without relying on driver capabilities from the computing server 102.

The storage server 104 may include a memory manager 118 and one or more storage media (also referred to as memory) 120a, 120b (collectively referenced as 120). In some embodiments, the storage media 120 are disaggregated storage devices that allow their storage space to be shared by the one or more VMs 108. Access to the storage media may be over the interface 106 using a protocol such as NVMe or NVMe-oF, although embodiments are not limited thereto. For example, other protocols may be used in addition or in lieu of NVMe, such as, for example, SATA, SCSI, SAS, and/or other wired or wireless protocol.

In some embodiments, the storage media 120 may include one or more volatile computer-readable storage medium and/or non-volatile computer-readable storage medium. In some embodiments, the storage server 104 includes at least a first storage medium (hereinafter referred to as "primary storage") 120a associated with a first access latency (e.g., a volatile storage medium), and at least a second storage medium (hereinafter referred to as "secondary storage") 120b associated with a second access latency (e.g., a non-volatile storage medium). The first and second storage media may together form a hybrid memory pool.

In one embodiment, the volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory component (RIMM), dual in-line memory component (DIMM), single in-line memory component (SIMM), video random access memory (VRAM), cache memory (including various levels), flash memory, register memory, and/or the like.

In one embodiment, the non-volatile computer-readable storage medium may include a floppy disk, flexible disk, hard disk, solid-state storage (SSS) (for example a solid-state drive (SSD)), solid state card (SSC), solid state component (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (for example Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (Fe-RAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In some embodiments, the memory manager 118 is implemented via a processor included in the storage server 104. The memory manager 118 may perform the functionalities of a storage or memory controller to control the data stored in the storage server 104. In this regard, the memory manager 118 may control the transmission or processing of commands and/or data. For example, the memory manager 118 may process a request for data from a process running on a VM 108. The request may include, for example, a request to load or store data to or from a memory address.

In some embodiments, processing of a request for data includes examining the primary storage 120a (e.g., RAM) in the storage server 104 for determining whether the requested data is included in the primary storage. In response to determining that the requested data is not included in the primary storage 120a, the memory manager 118 may be configured to generate a memory fault signal which may be recorded in a log. The memory manager 118 may further retrieve the requested data from the secondary storage 120b (e.g., SSD) into the primary storage 120a, allowing future requests for the data to be quickly processed.

In some embodiments, the memory manager 118 anticipates that the requesting process may need other data in addition to the currently requested data, and proceeds to prefetch the anticipated data from the secondary storage 120b into the primary storage 120a. The prefetching of the data may be prior to reference or use of the data by the process. The prefetching of the data may help lower the data access time experienced by the process.

The identification of the data to be prefetched may be based on a prefetching algorithm or procedure executed by the memory manager 118. In some embodiments, the memory manager 118 is configured with at least a first prefetching algorithm or procedure, and a second prefetching algorithm or procedure. The memory manager may make a selection of either the first prefetching algorithm or the second prefetching algorithm to execute to identify the data that is to be prefetched. The selection of the prefetching algorithm to use may occur on a period basis, or whenever prefetching is needed. The selection of the prefetching algorithm to execute may be based on a criterion. The criterion may include a rate of success of a current prefetching algorithm in identifying the appropriate data to be prefetched, in comparison to a threshold rate.

Figure 2:
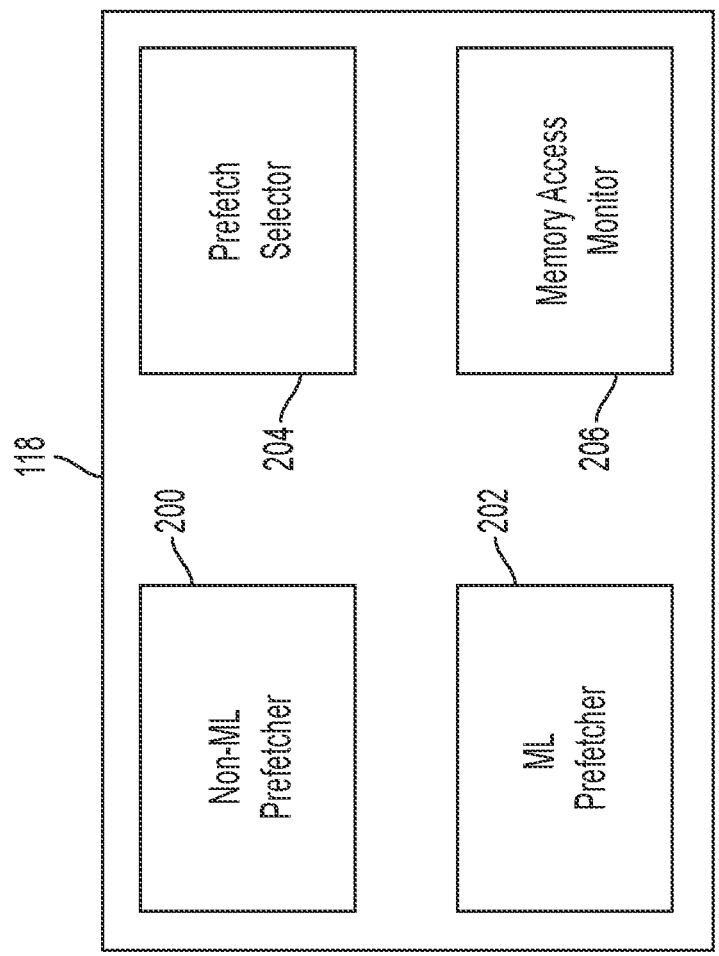
FIG. 2 depicts a block diagram of a memory manager according to one or more embodiments.

FIG. 2 depicts a block diagram of the memory manager 118 according to one or more embodiments. In some embodiments, the memory manager 118 includes a first prefetcher (also referred to as a non-ML prefetcher) 200, a second prefetcher (also referred to as an ML prefetcher) 202, a prefetch selector 204, and a memory access monitor 206. The first and second prefetchers 200, 202, prefetch selector 204, and memory access monitor 206 may also respectively be referred to as a first and second prefetching circuits, prefetch selector circuit, and memory access monitor circuit.

In some embodiments, the first prefetcher 200 includes a first prefetching algorithm or procedure for prefetching data from the secondary storage 120b to the primary storage 120a, and the second prefetcher 202 includes a second prefetching algorithm different from the first prefetching algorithm. In some embodiments, the first prefetching algorithm is a non-ML based algorithm that identifies a prefetch memory address based on a detected memory access pattern. The detected memory access pattern may be, for example, a sequential pattern, strided pattern, random pattern, and/or the like.

In some embodiments, the access pattern detected by the first prefetcher 200 is based on memory accesses that result in memory fault signals being generated when data requested by a process is not found in the primary storage 120a. In one embodiment, the memory access monitor 206 is configured to detect and log the generated memory faults. The log may be correlated to the process for which memory faults are generated, and may include a chronological list of virtual memory addresses associated with the memory faults. In some embodiments, the log may include additional information such as, for example, the data access command that triggered the fault, (e.g., rload, store, etc.), data size, time stamp, and/or the like.

The first prefetcher 200 may examine the memory access information in the access log, and generate a rule for identifying a memory address based on the detected pattern. For example, the first prefetcher 200 may detect a sequential memory access pattern (e.g., access to memory locations 1, 2, . . . k), and generate a rule that increments the memory location by 1. Using the sequential access rule, the memory address following the kth memory location in this example is (k+1).

In another example, the first prefetcher 200 may detect a strided memory access (e.g., access to memory locations 1, 4, 7, . . . k), and generate a rule that increments the memory location by a number greater than 1. Using the strided access rule, the memory address following the kth memory location in this example is (k+3).

In some embodiments, the second prefetcher 202 includes an ML based algorithm for prefetching data from the secondary storage 120b to the primary storage 120a. In this regard, the second prefetcher 202 may include an ML model or network that is trained to predict a memory address that is to be requested by a process, based on prior memory accesses by the process logged by the memory access monitor 206. In some embodiments, the prior memory accesses that are used by the ML model include those that result in memory fault signals (e.g., when the requested data is not found in the primary storage 120a).

In some embodiments, the ML network includes a deep neural network (DNN) such as, for example, a long short term memory (LSTM) network, convolutional neural network (CNN), and/or other recurrent or non-recurrent neural network. Using the LSTM network as an example, the network may receive a sequence of prior data accesses by a process as input data (also referred to as input features or vectors), and use the sequence to make inferences or predictions of one or more next data accesses by the process. The input features may be based on the access log maintained by the memory access monitor 206. In some embodiments, the LSTM network attempts to match the input sequence to a learned sequence, to generate the prediction of the one or more future data accesses.

In some embodiments, the prefetch selector 204 is configured to select one of the first prefetcher 200 or the second prefetcher 202 for prefetching data. By prefetching additional data from the secondary storage 120b to the primary storage 120a, in addition to the data requested by the processor, faster access may result to the additional data when the additional data is requested and used by the process. In this manner, a desired performance of the process may be maintained, while reducing the need and/or cost for additional primary storage.

In some embodiments, the selection of the prefetcher is triggered by a memory fault signal when data requested by a process is not located in the primary storage 120a. In some embodiments, the selection of the prefetcher is triggered by a passage of a certain amount of time.

In some embodiments, the prefetch selector 204 is adaptive. For example, the prefetcher to be used may depend on a criterion. The criterion may include, for example, a success rate (also referred to as a hit rate) associated with the prefetched data, availability of computing resources (e.g., processor, memory, etc.), and/or the like. In some embodiments, the prefetch selector 204 maintains access information for the prefetched data in a prefetch log. In this regard, the prefetch selector 204 may record the memory addresses prefetched by the first and/or second prefetcher 200, 202, for one or more processes, in response to a memory fault. The prefetch selector 204 may monitor during a monitoring period, a total number of requests following the memory fault, and determine how many of the total number of total requests were satisfied (e.g., a "hit" result) by the prefetched data in the primary storage 120a. The prefetch selector 204 may set a flag for the prefetched memory location that results in a hit. A hit rate may be computed based on the total number of requests and the number of requests that resulted in a hit.

In some embodiments, if the hit rate is above a set threshold hit rate, the prefetch selector may select the first prefetcher 200 for prefetching data according to the non-ML-based algorithm of the first prefetcher. The threshold hit rate may be, for example, above 50% (e.g., 60-70%). For example, if 10 memory pages are prefetched by the memory manager 118, and 9 of the prefetched memory pages are accessed later, resulting in a hit, the prefetch selector 204 may switch to (or continue with), the first prefetcher 200. If, however, the hit rate is below the threshold hit rate, the prefetch selector 204 may switch to the second prefetcher 202 for increasing the hit rate.

Figure 3:
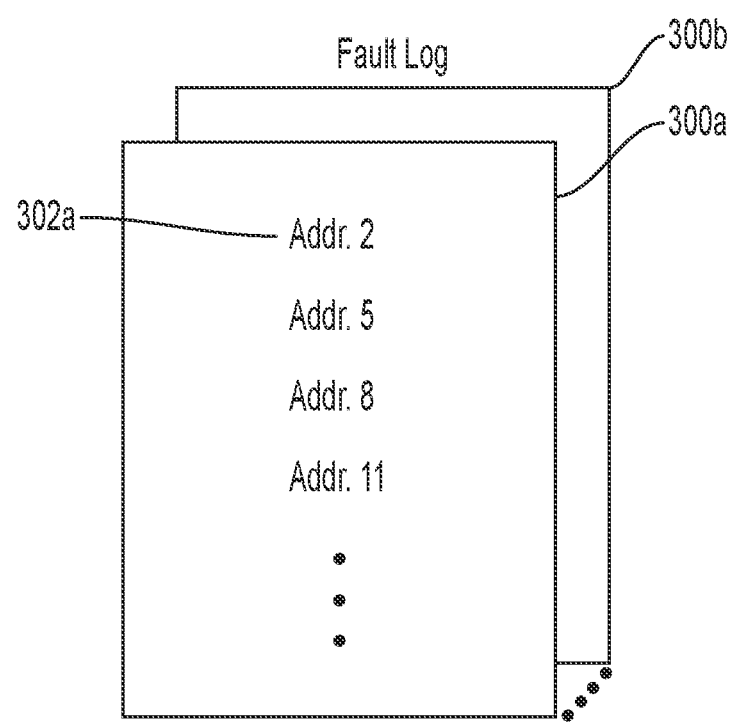
FIG. 3 depicts a layout diagram of a fault log (also referred to as an access log) according to one or more embodiments.

FIG. 3 depicts a layout diagram of a fault log (also referred to as an access log) 300a according to one or more embodiments. The fault log 300a may correspond to a process executed by a VM 108. A second fault log may be maintained for a second process. In some embodiments, the fault log 300a provides a memory access history by the corresponding process that triggered a memory fault. In some embodiments, the memory addresses recorded in the fault log 300a are virtual memory addresses 302a subject to the memory fault. In some embodiments, the fault log 300a is cleared in response to a trigger event. The trigger event may be passage of a certain amount of time, termination of the corresponding process, and/or the like.

In some embodiments, the memory access history in the fault log 300a is used by the first prefetcher 200 and/or second prefetcher 202 for determining one or more next addresses to be prefetched from the secondary storage 120b. For example, the first prefetcher 200 may examine the access history to deduce an access pattern. A rule may be generated for incrementing a memory address based on the deduced access pattern. In the example of FIG. 3, the prefetcher 200 may deduce a strided access pattern where memory addresses increase by 3. Based on the deduced access pattern, the prefetcher 200 may prefetch one or more memory addresses using a rule that increments the memory address by 3 (e.g., memory #14, #17, and #20).

Figure 4:
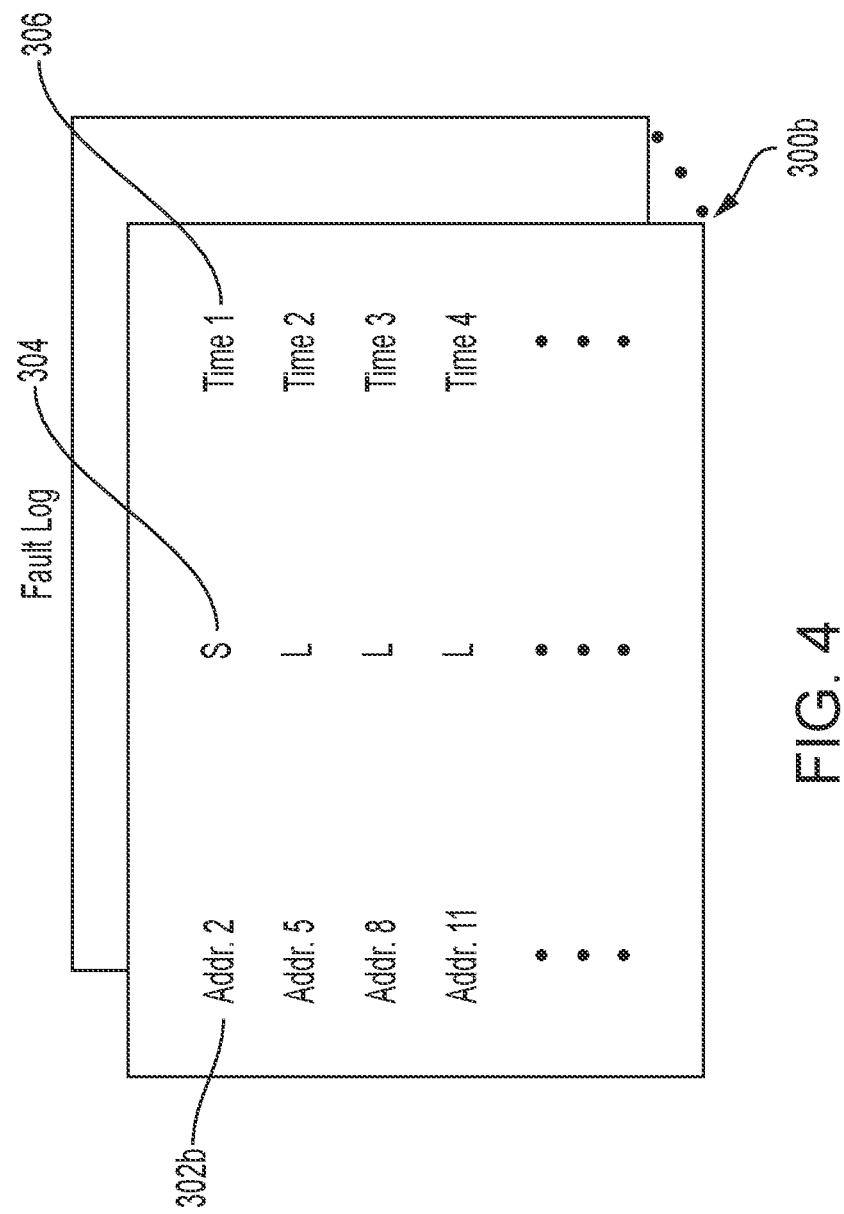
FIG. 4 depicts a layout diagram of a fault log according one or more other embodiments.

FIG. 4 depicts a layout diagram of a fault log 300b according one or more other embodiments. The fault log 300b according to one or more other embodiments may include additional information in addition to a list of memory addresses 302b that resulted in a memory fault signal. The additional information may include, without limitation, a type of command 304 from the process (e.g., store or write command, load or read command, flush command, etc.), timestamp data 306, and/or the like.

In some embodiments, one or more of the information in the fault log 300b is used by the first prefetcher 200 and/or the second prefetcher 202 for determining one or more next addresses to be prefetched from the secondary storage 120b. For example, the second prefetcher 202 may use the information in the log as input features to an ML network such as, for example, an LSTM network. The ML network may output a prediction of one or more memory addresses that are anticipated to be requested and used by the corresponding process, using the input features. The second prefetcher 202 may prefetch the one or more predicted memory addresses into the secondary storage 120b.

Figure 5:
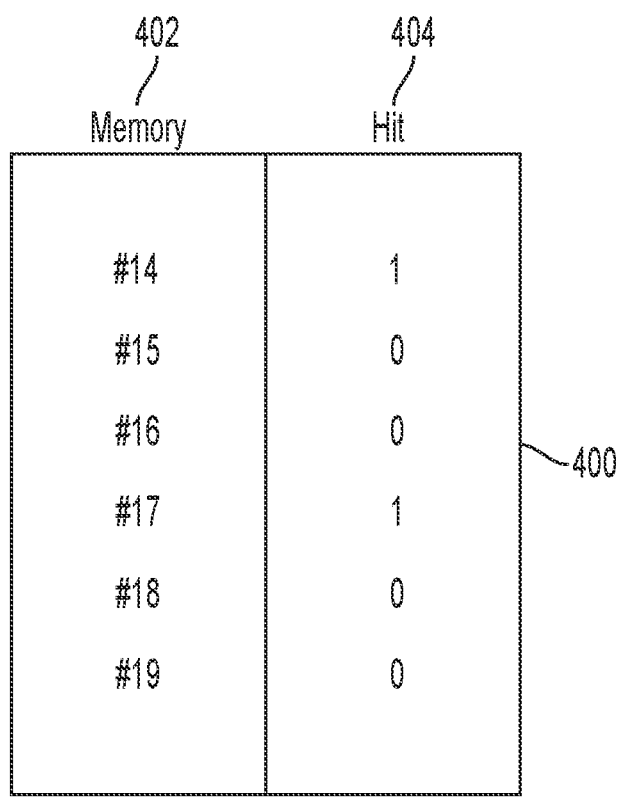
FIG. 5 depicts a layout diagram of a prefetch log according to one or more embodiments.

FIG. 5 depicts a layout diagram of a prefetch log 400 according to one or more embodiments. The prefetch log 400 may include one or more memory addresses 402 prefetched by the first and/or second prefetcher 200, 202, in response to a memory fault. The prefetched memory addresses 402 may be associated with one process or multiple processes running on one or more VMs 108. In some embodiments, the prefetch log 400 includes a hit flag 404 indicative of whether the prefetched data resulted in a hit. For example, a value of "1" may indicate a hit, while a value of "0" may indicate a miss.

In some embodiments, the prefetch selector 204 calculates a hit rate based on the prefetch log 400. The hit rate may be used for determining whether the first prefetcher 200 or the second prefetcher 202 may be used for prefetching future data. The determination of the prefetcher to use may be made on a process-by-process basis, or for multiple (e.g., all processes) running on one or more VMs 108.

Figure 6:
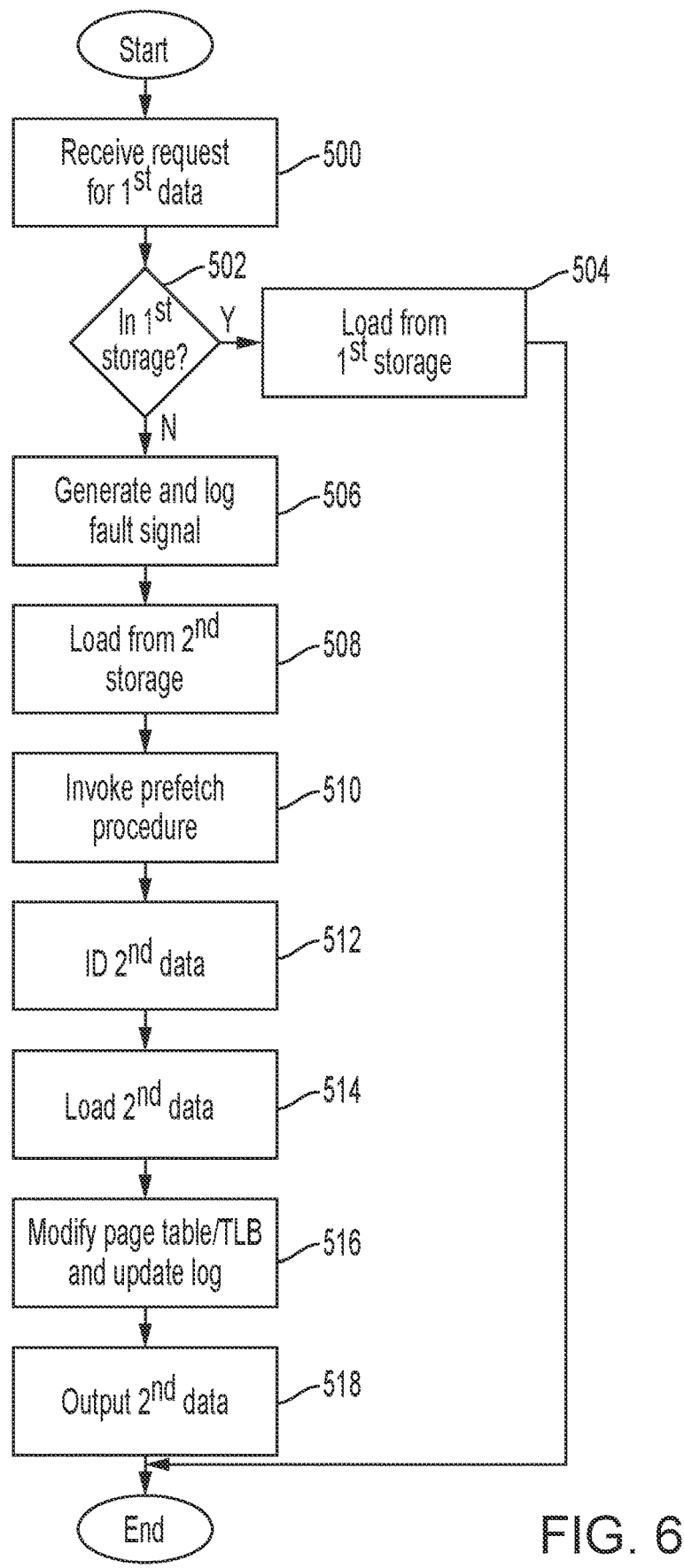
FIG. 6 depicts a flow diagram of a memory access process according to one or more embodiments.

FIG. 6 depicts a flow diagram of a memory access process according to one or more embodiments. The process starts, and in act 500, the memory manager 118 receives a request for first data (e.g., a first data block) from a process running on the VM 108. The request may be, for example, a request to load/read data, store/write data, and/or the like. The request may be made during execution of the process. The request may include a storage address associated with the first data. The storage address may be, for example, a logical memory address. The logical memory address may be converted into a physical memory address via a page table and/or TLB. The translation of the address using the page table and/or TLB may be performed by the memory manager 118 and/or the VM 108 (e.g., the MMU 112 associated with the VM).

In act 502, a determination is made as to whether the first data corresponding to the physical memory address is located in the primary storage (first storage medium) 120a. If the first data is located is the primary storage 120a, the first data is fetched or load from the primary storage 120a in act 504, and provided to the requesting process for use by the process. In some embodiments, the fetched data may be stored in a local memory (e.g., memory 111) of the VM 108 running the process. The requesting process may generate an output in response to the loaded data. The output may be used for an e-commerce application, database application, machine learning application, and/or the like.

In some embodiments, the local memory (e.g., the VM memory 111) is searched first for determining whether the first data resides in the local memory. The primary storage 120a may be searched in response to determining that the first data does not reside in the local memory.

Referring again to act 502, if the first data corresponding to the physical memory address is not located in the primary storage 120a, a memory fault signal may be generated (e.g., by the memory manager 118), in act 506. A fault log (e.g., fault log 300a, 300b) may be updated in response to the memory fault signal. For example, the fault log 300a, 300b may be updated to include at least the memory address triggering the fault signal.

In act 508, the first data is loaded or read from the secondary storage 120b (second storage medium) into the primary storage 120a, and provided to the requesting process for use by the process to generate an output.

In act 510, the current prefetch procedure is invoked for identifying, in act 512, second data to be prefetched. In this regard, if the current prefetch procedure is a non-ML based procedure, the first prefetcher 200 examines the memory access information in the access log (e.g., fault log 300) maintained by the access monitor 206, and generates a rule for identifying the address of the second data based on the detected pattern.

If the current prefetch procedure is a ML-based procedure, the second prefetcher 202 identifies the input features to be provided to the ML network based on the access log. The ML network generates a prediction of an address that is likely to be requested by the process, based on the input features.

In act 514, the current prefetch procedure identifies retrieves (or loads) the second data identified by the address, from the secondary storage 120b to the primary storage 120a.

In act 516, the memory manager 118 modifies a page table or TLB to map the virtual address for the data to the new physical address in the primary storage 120*a*. The prefetch log 400 may also be updated with the prefetched memory address.

As the process executes, a further request may be made for the second data. Because request for the data was anticipated and prefetched into the primary storage 120*a*, the data is retrieved and output, in act 518, from the primary storage 120*a* instead of the secondary 120*b*, expediting access to the second data. The hit flag 404 of the prefetch log 400 may also be updated in response to the access.

Figure 7:
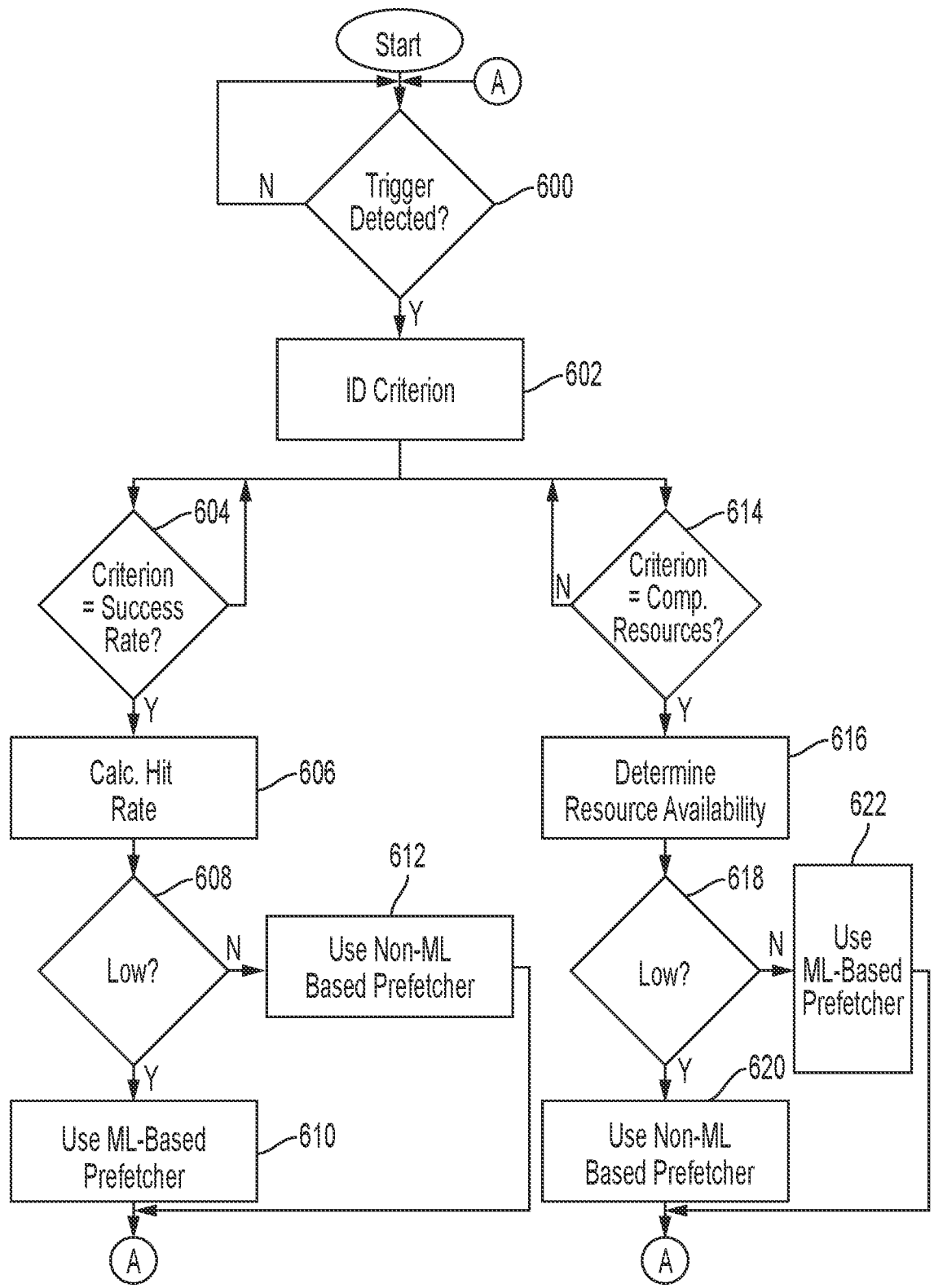
FIG. 7 depicts a flow diagram of a process for selecting a prefetch procedure according to one or more embodiments.

FIG. 7 depicts a flow diagram of a process for selecting a prefetch procedure according to one or more embodiments. The process may be executed, for example, by the prefetch selector 204, in response to a trigger. In some embodiments, the trigger is passage of a certain amount of time. According to this embodiment, the selection of the prefetch procedure occurs on a period basis. In some embodiments, the trigger is detecting a page fault. According to this embodiment, the selection of the prefetch procedure occurs with the occurrence of a page fault.

The process starts, and in act 600, a determination is made as to whether a trigger for selecting the prefetch procedure has been detected.

If the answer is YES, a criterion for selecting the prefetch procedure is identified in act 602. For example, the criterion may be a hit rate (also referred to as a success metric) of the current prefetch procedure and/or availability of computing resources of the storage system 104.

If the criterion is the success metric, as determined in act 604, the prefetch selector 204 calculates, in act 606, the hit rate of the current prefetch procedure from the access history maintained in the prefetch log (e.g., prefetch log 400).

In act 608, a determination is made as to whether the computed hit rate is low. The computed hit rate may be deemed to be low in response to the hit rate being below a hit rate threshold. The computed hit rate may also be deemed to be low in response to the hit rate trending down (e.g., the hit rate decreasing over T consecutive time periods).

If the hit rate is determined to be low, the prefetch selector 204 selects, in act 610, the ML-based prefetcher 202 as the current prefetch procedure as the ML based prefetcher is assumed to have higher prediction accuracy than the non-ML based prefetcher.

If the hit rate is not deemed to be low, the prefetch selector 204 selects, in act 612, the non-ML based prefetcher 200 as the current prefetch procedure.

Referring again to act 602, if the identified criterion is availability of computing resources (e.g., computing resources of the storage system 104), as determined in act 612, the prefetch selector 204 determines, in act 614, availability of one or more computing resources (e.g., processor and/or memory).

In act 616, the prefetch selector 204 determines whether one or more of the computing resources is low. In this regard, the prefetch selector 204 may compare the availability of the computing resources against one or more threshold values. For example, the prefetch selector 204 may compare the availability of processor resources to a threshold processor value, the availability of memory resources to a threshold memory value, and/or the like. If availability of the processor and/or memory resources are below the corresponding thresholds, the prefetch selector may determine the computing resource to be low.

If the computing resources are low, the prefetch selector selects, in act 618, the non-ML based prefetcher 200 as the current prefetch procedure.

If the computing resources are not deemed to be low, the prefetch selector 204 selects, in act 620, the ML-based prefetcher 202 as the current prefetch procedure.

In some embodiments, both the availability of computing resources and hit rate are considered in selecting the prefetching procedure, where consideration of the computing resources takes priority over the hit rate. For example, the non-ML based prefetching procedure may be selected even if the hit rate is deemed to be low, if the computing resources are also deemed to be low.

The term processor used herein may refer to one or more processors and/or one or more processing cores. The one or more processors may be hosted in a single device or distributed over multiple devices (e.g. over a cloud system). A processor may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processor, as used herein, each function is performed either by hardware configured, i.e., hard-wired, to perform that function, or by more general-purpose hardware, such as a CPU, configured to execute instructions stored in a non-transitory storage medium (e.g. memory). A processor may be fabricated on a single printed circuit board (PCB) or distributed over several interconnected PCBs. A processor may contain other processing circuits; for example, a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. Also, unless explicitly stated, the embodiments described herein are not mutually exclusive. Aspects of the embodiments described herein may be combined in some implementations.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Although exemplary embodiments of systems and methods for on-demand data storage management have been specifically described and illustrated herein, many modifications and variations will be apparent to those skilled in the art. Accordingly, it is to be understood that systems and methods for on-demand data storage management constructed according to principles of this disclosure may be embodied other than as specifically described herein. The disclosure is also defined in the following claims, and equivalents thereof.

The systems and methods described herein may contain one or more combination of features set forth in the below statements.

Statement 1. A storage system comprising: a first storage medium; a second storage medium; a controller configured to communicate with the first storage medium and the second storage medium, the controller being configured to: receive a first request generated by a process associated with first data; determine that the first data is stored in the first storage medium; generate a signal based on the controller being configured to determine; identify a criterion based on the signal; select, based on the criterion, at least one of a first procedure or a second procedure for loading second data from the second storage medium to the first storage medium; and output the second data based on a second request generated by the process for the second data.

Statement 2. The storage system of Statement 1, wherein a latency associated with accessing the first storage medium is lower than a latency associated with accessing the second storage medium.

Statement 3. The storage system of Statement 1, wherein the signal is generated based on determining absence of the first data in the first storage medium.

Statement 4. The storage system of Statement 3, wherein the controller is configured to: load the first data from the second storage medium to the first storage medium.

Statement 5. The storage system of Statement 1, wherein the criterion includes a success metric associated with the second data.

Statement 6. The storage system of Statement 5, wherein the success metric is based on success of loading the second data from the second storage medium to the first storage medium.

Statement 7. The storage system of Statement 1, wherein the controller is further configured to: add a second memory location associated with the second data to a log; and update the log to indicate success of fulfilling the second request from the first storage medium.

Statement 8. The storage system of Statement 1, wherein the criterion includes an availability of a computing resource.

Statement 9. The storage system of Statement 1, wherein the first procedure is configured to identify a second memory location storing the second data based on an identified access pattern.

Statement 10. The storage system of Statement 1, wherein the second procedure includes a neural network configured to predict a second memory location storing the second data based on input features to the neural network.

Statement 11. A method comprising: receiving a first request generated by a process associated with first data; determining that the first data is stored in a first storage medium; generating a signal based on the determining; identifying a criterion based on the signal; selecting, based on the criterion, at least one of a first procedure or a second procedure for loading second data from a second storage medium to the first storage medium; and outputting the second data based on a second request generated by the process for the second data.

Statement 12. The method of Statement 11, wherein a latency associated with accessing the first storage medium is lower than a latency associated with accessing the second storage medium.

Statement 13. The method of Statement 11, wherein the signal is generated based on determining absence of the first data in the first storage medium.

Statement 14. The method of Statement 13 further comprising: loading the first data from the second storage medium to the first storage medium.

Statement 15. The method of Statement 11, wherein the criterion includes a success metric associated with the second data.

Statement 16. The method of Statement 15, wherein the success metric is based on success of loading the second data from the second storage medium to the first storage medium.

Statement 17. The method of Statement 11 further comprising: adding a second memory location associated with the second data to a log; and updating the log to indicate success of fulfilling the second request from the first storage medium.

Statement 18. The method of Statement 11, wherein the criterion includes an availability of a computing resource.

Statement 19. The method of Statement 11, wherein the first procedure identifies a second memory location storing the second data based on an identified access pattern.

Statement 20. The method of Statement 11, wherein the second procedure includes a neural network that predicts a second memory location storing the second data based on input features to the neural network.

What is claimed is:

1. A storage system comprising:
a first storage medium;
a second storage medium;
a controller configured to communicate with the first storage medium and the second storage medium, the controller being configured to:
receive a first request generated by a process associated with first data;
search for the first data in the first storage medium and generate a fault signal based on the search;
identify a criterion based on the fault signal;
select, based on the criterion, at least one of a first procedure or a second procedure for loading second data from the second storage medium to the first storage medium; and
output the second data based on a second request generated by the process for the second data.

2. The storage system of claim 1, wherein a latency associated with accessing the first storage medium is lower than a latency associated with accessing the second storage medium.

3. The storage system of claim 1, wherein the fault signal is generated based on determining absence of the first data in the first storage medium.

4. The storage system of claim 3, wherein the controller is configured to:
load the first data from the second storage medium to the first storage medium.

5. The storage system of claim 1, wherein the criterion includes a success metric associated with the second data.

6. The storage system of claim 5, wherein the success metric is based on success of loading the second data from the second storage medium to the first storage medium.

7. The storage system of claim 1, wherein the controller is further configured to:
- add a second memory location associated with the second data to a log; and
- update the log to indicate success of fulfilling the second request from the first storage medium.

8. The storage system of claim 1, wherein the criterion includes an availability of a computing resource.

9. The storage system of claim 1, wherein the first procedure is configured to identify a second memory location storing the second data based on an identified access pattern.

10. The storage system of claim 1, wherein the second procedure includes a neural network configured to predict a second memory location storing the second data based on input features to the neural network.

11. A method comprising:
- receiving a first request generated by a process associated with first data;
- searching for the first data in a first storage medium and generating a fault signal based on the searching;
- identifying a criterion based on the fault signal;
- selecting, based on the criterion, at least one of a first procedure or a second procedure for loading second data from a second storage medium to the first storage medium; and
- outputting the second data based on a second request generated by the process for the second data.

12. The method of claim 11, wherein a latency associated with accessing the first storage medium is lower than a latency associated with accessing the second storage medium.

13. The method of claim 11, wherein the fault signal is generated based on determining absence of the first data in the first storage medium.

14. The method of claim 13 further comprising:
- loading the first data from the second storage medium to the first storage medium.

15. The method of claim 11, wherein the criterion includes a success metric associated with the second data.

16. The method of claim 15, wherein the success metric is based on success of loading the second data from the second storage medium to the first storage medium.

17. The method of claim 11 further comprising:
- adding a second memory location associated with the second data to a log; and
- updating the log to indicate success of fulfilling the second request from the first storage medium.

18. The method of claim 11, wherein the criterion includes an availability of a computing resource.

19. The method of claim 11, wherein the first procedure identifies a second memory location storing the second data based on an identified access pattern.

20. The method of claim 11, wherein the second procedure includes a neural network that predicts a second memory location storing the second data based on input features to the neural network.

* * * * *